United States Patent [19]

Sanford

[11] 4,041,286
[45] Aug. 9, 1977

[54] METHOD AND APPARATUS FOR DETECTING CHARACTERISTIC FEATURES OF SURFACES

[75] Inventor: Norman R. Sanford, Piqua, Ohio

[73] Assignee: The Bendix Corporation, Southfield, Mich.

[21] Appl. No.: 633,940

[22] Filed: Nov. 20, 1975

[51] Int. Cl.$^2$ .................... G06F 15/20; H04N 7/02
[52] U.S. Cl. ........................... 235/151.3; 358/107; 358/139; 358/903; 358/559; 358/579
[58] Field of Search ............... 235/151.3, 151.1, 151; 178/6.8, DIG. 22, DIG. 36; 340/146.3 H; 356/165, 167, 168, 102; 250/557, 567; 318/640

[56] References Cited

U.S. PATENT DOCUMENTS

| | | | |
|---|---|---|---|
| 3,321,575 | 5/1967 | Lewczyk | 178/DIG. 36 |
| 3,643,018 | 2/1972 | Adler | 356/167 X |
| 3,670,153 | 6/1972 | Rempert et al. | 235/151.3 X |
| 3,674,926 | 7/1972 | Dewey et al. | 178/DIG. 36 X |
| 3,804,270 | 4/1974 | Michaud et al. | 214/1 CM X |

*Primary Examiner*—Joseph F. Ruggiero
*Attorney, Agent, or Firm*—Raymond J. Eifler; Kenneth A. Seaman

[57] ABSTRACT

A novel system is provided for detecting the presence of a characteristic feature on an illuminated surface of an object when used in conjunction with known electro-optical systems for determining the position of the centroid of the outline of the object with relation to the supporting surface and the rotation of the object relative to the rotational orientation of a test part. The surface is illuminated at an angle that enhances the contrast of the characteristic feature while using a vidicon-type image converter tube which scans the field which includes the object. The location, with respect to the centroid, of a circular window area encompassing the characteristic feature and the radius of the circular window are determined utilizing a television monitor connected to the vidicon. Next the operator determines and stores a pair of separated threshold levels which control a level detector which compares the vidicon output to the threshold level to derive a binary output so that one of the threshold levels separates the white area in the window area from the gray-black area while the other threshold level separates the black area in the window area from the white-grey areas. The system then analyzes and stores the relative amounts of white, gray and black areas in the window as a signature signal representative of the characteristic feature of the surface. Following this "teach" phase, the system may be used to determine whether a subsequent object contains a feature which correlates well with the characteristic of the test part by analyzing the output of the vidicon at the window for both threshold levels and determining the correlation between these levels and the values obtained during the teach phase.

9 Claims, 7 Drawing Figures

METHOD AND APPARATUS FOR DETECTING CHARACTERISTIC FEATURES OF SURFACES

BACKGROUND OF THE INVENTION

I. Field of the Invention

The present invention relates generally to electro-optical systems which receive light information from parts supported on a reference surface for determining the position of the object, and more particularly, to an electro-optical system which utilizes oblique front lighting for enhancing a characteristic feature on the surface of the object.

II. Prior Art

For automated manufacturing and/or handling systems which operate on a discrete part basis, the parts or work pieces must typically be supported in a unique orientation relative to the operating system in order for the system to properly operate. In many known systems certain parts are supplied to the system in bulk containers in an unorientated relationship and must be orientated before they can be operated on in a discrete basis. While certain parts, such as screws, rivets, and the like, are often orientated by special delivery tracks, many parts, and particularly those parts of relatively large size, are not suitable for orientation by such techniques. Moreover, the delicate nature of such parts often require that they be handled on a more discrete basis.

If parts of this type are to be automatically manipulated, information must be provided to the system, or generated within the system, from which the instantaneous orientation and position of the parts may be determined so that the part may be engaged and orientated relative to the system by an automatic mechanism. One such system has been disclosed in a co-pending application entitled "Method and Apparatus for Determining the Position of a Body", Ser. No. 470,345, filed on May 16, 1974 to Jimmy A. Michaud which is of common ownership with the present invention. Briefly, in that previously disclosed system, an unorientated part is placed on a backlit presenter stage and a vidicon-type image converter generates an electric signal representative of the silhouette of the part. Control means, which may comprise a preprogrammed computer, then analyzes the silhouette of the part to determine the position of the centroid and the angular rotation of the part relative to the centroid and rotational orientation of a test part. Following these computations, the part may be manipulated or operated on as desired.

These previously known electro-optical systems, however, suffer the disadvantage that a given silhouette may not uniquely determine the face of the part being viewed. For example, a given part may have two or more faces, one of which contains a distinctive feature on its surface, in which a backlit silhouette of the part does not reveal the distinctive feature. For these parts the previously known two dimensional part identification systems are inadequate to determine the face of the part being viewed and, hence, the complete orientation of the part on the presenter stage.

SUMMARY OF THE INVENTION

The system of the present invention obviates the above mentioned disadvantages of the previously known electro-optical systems by providing a system whereby a characteristic feature on the surface of an object is illuminated by oblique front or side lighting designed to enhance the contrast of the characteristic feature in order to supply sufficient information for determining the face of the object being viewed. The system of the invention may be divided roughly into a teach mode for creating a file of characteristic features of a test part, and a run mode for comparing the information stored in the file to presently received information from an object to determine whether the object contains a feature which correlates well with the characteristic feature of the test part.

In the teach mode a test part is placed on a stage and oblique front or side lighting is utilized to enhance a characteristic feature on the surface of the test part. A vidicon-type image converter tube which generates an analog electrical signal in response to the light intensity of the viewing area, is directed at the stage on which the object is positioned and has its output connected to a level detector which compares the vidicon output to the threshold level to derive and generate a binary output in response thereto. The operator then determines the coordinate location with respect to the centroid of the object, and the radius of a circular window encompassing the characteristic feature on the object surface. The operator next determines pair of separated threshold levels so that with one threshold level the level detector generates a binary signal representative of the separation between the white area and the gray and black areas viewed by the vidicon while with the second threshold level the black area in the window is separated from the white and gray areas in the window. Simple computations then yield the amount of gray area within the window and this information together with the threshold level, size, and position of the window relative to the centroid of the part are stored in a file for later use in the run mode.

The run mode is utilized to determine the face of the part being viewed on the stage of a subsequent object. In the run mode the position of the centroid of the object and the angular rotational orientation of the object are determined relative to the position of the test part by the previously known methods. The window position and size as determined for the test part, are then viewed by the vidicon and the relative amounts of white and black area within the window is determined by using each of the previously determined threshold values. The absolute difference between the white, gray, and black areas of the object and the like areas of the test object are computed and this information is correlated to determine if the characteristic feature of the test object is present on the subsequent object. If the correlation between the subsequent object and test part is good, the face of the object is identified and subsequent manipulating or inspection operations may proceed. If the correlation between the subsequent object and the test part is not good, the remaining test part faces are contrasted against the object to determine which face of the object is being viewed.

In this manner, the system of the present invention provides a novel means whereby an object having two or more faces with substantially identical backlit silhouettes may be identified by using front or side lighting.

BRIEF DESCRIPTION OF THE DRAWINGS

The system of the present invention will be more clearly understood by reference to the following detailed description, when read in conjunction with the accompanying drawing in which like reference characters refer to like parts throughout the several views, and in which.

DETAILED DESCRIPTION OF THE PRESENT INVENTION

At the outset, it will be understood that the present invention is supplemental to, rather than substitutionary of, the aforementioned patent application. Furthermore, for the sake of brevity, unnecessary repetition of the disclosure contained in the aforementioned application will be avoided where feasible, and reference to the application should be had for a better understanding of those portions of the present system which form no part of the present invention.

Figure 1:
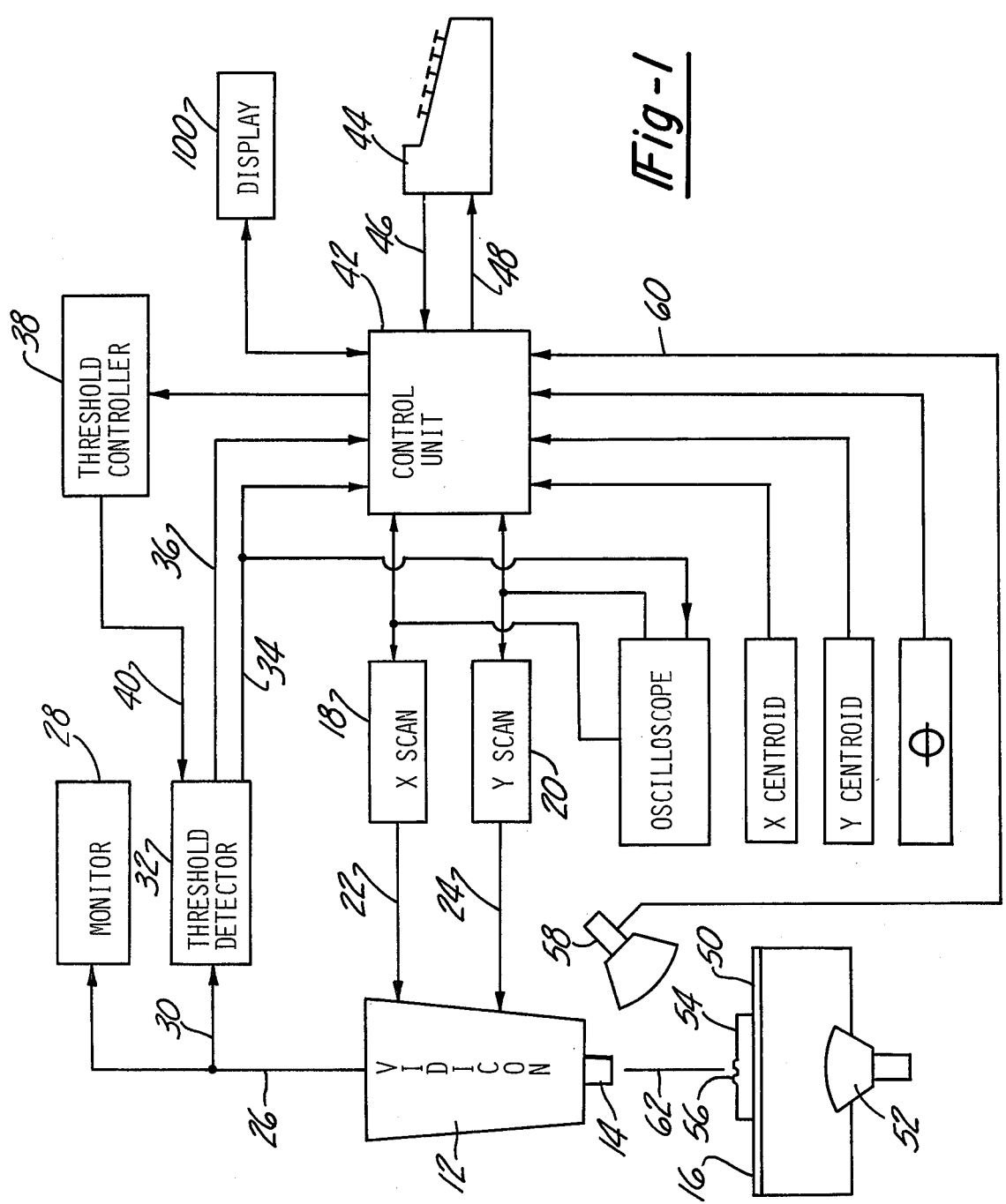
FIG. 1 is a block diagrammatic view of the system of the present invention.

Referring now to FIG. 1, a circuit diagram illustrating the system of the present invention is thereshown and comprises a vidicon-type converter 12 having a lens system 14 adapted to view a presenter state 16 an X-dimension scan controller 18 and Y-dimension scan controller 20 provide signals via lines 22 and 24, respectively, to control the scanning area of the vidicon 12. The scan controllers 18 and 20 may direct the vidicon 12 to scan a normal rectangular raster or, as in the preferred embodiment, may direct the vidicon 12 to scan a circular area for a reason to become hereinafter apparent.

The vidicon generates an analog electrical signal at its output line 26 which is connected to a television monitor 28 to provide an optical signal to the operator of the scanning area of the vidicon. The vidicon output 26 is also connected by line 30 to a threshold detector 32 which detects the passage of the video output of the vidicon 12 through a particular predetermined voltage and produces a binary output along line 34 indicative of whether the vidicon output 26 is above or below the threshold value. Preferably the threshold system 32 generates a pulse on a second output line 36 simultaneously with the transistion of the polarity of the line 34. A threshold controller 38 generates an output along line 40 for operatively controlling the threshold value of the threshold detector 32. A control unit 42 is provided for operatively controlling the X and Y deflection controllers 18 and 20 and the threshold controller 38.

The control unit 42 may comprise, as in the preferred form of the invention, a minicomputer with a preprogrammed set of software instructions. Alternatively, of course, the control unit 42 may be hardwired, if desired, while remaining within the scope of the invention. Additionally, in the preferred embodiment of the invention, the system is interactive with the operator and for this purpose a terminal 44, such as a teletype or cathode ray display unit, is provided having its output fed to control unit 42 along line 46 and, in the well known manner, having an input line 48 from the control unit 42.

As will be remembered from the aforementioned patent application, the presenter stage 16 includes a translucent surface 50 and a lamp 52 underneath the stage 16. A part 54 on the stage 16 is opaque so that with the lamp 52 actuated, the vidicon 12 views only the outline or silhouette of the part 54. In the system of the present invention, however, front or side lighting is utilized to enhance a characteristic feature 56 on the part 54 and a lamp is shown diagrammatically at 58 for this purpose. The lamp 58 may be selectively actuated by signals along line 60 from the control unit 42 and also is positioned so that it emits radiation at an angle oblique to the viewing axis 62 of the vidicon 12.

Figure 6:
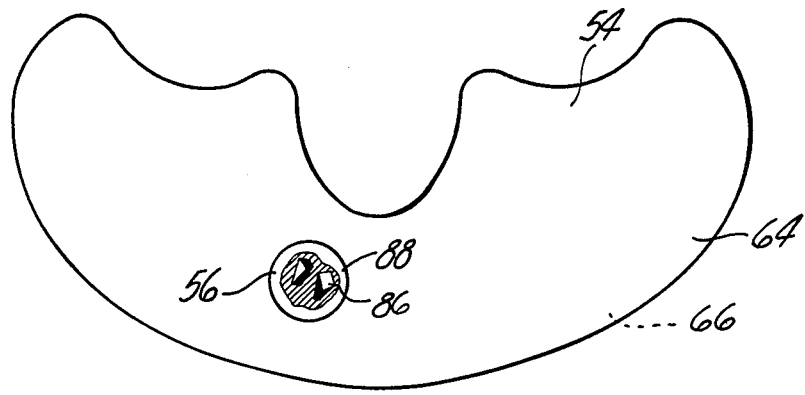
FIG. 6 is a front plan view of an arbitrary work piece and illustrating the window area of the present invention.
Figure 7:
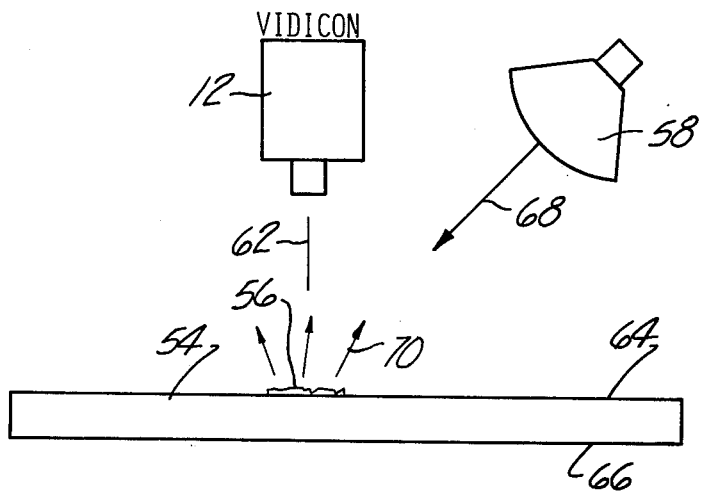
FIG. 7 is a side plan view illustrating the arbitrary work piece of FIG. 6.

Referring now briefly to FIGS. 6 and 7, the arbitrary test part 54 is shown having a characteristic feature 56 on face 64 thereof. The part 54, intended for illustration only, is shown comprising two flat sides 64 and 66, either of which may rest flat upon the presenter stage 18. The characteristic feature 56, however, is present on only one side 64 of the part 54 and, as should be apparent, the backlit silhouette of the part 54 is the same regardless of which side 64 or 66 lays on the presenter stage 16. Therefore, as taught by the system of the present invention, the lamp 58 is utilized to enhance the characteristic feature 56 in order to determine which face 64 or 66 is viewed by the vidicon 12.

Still referring to FIGS. 6 and 7, the characteristic feature 56 is shown comprising plurality of small projections although in practice the characteristic feature 56 may comprise projections, depressions, or even simply a different surface texture. Illumination from the lamp 58, shown by arrow 68, impinges upon the characteristic feature 56 and is reflected in accordance with the contour of the feature 56, as shown by arrows 70. As viewed along the vidicon viewing axis 62, the reflection of the illumination from the lamp 58 by the characteristic feature 56 produces relatively white, relatively gray, and relatively black areas as shown in FIG. 6. Integration of the white, gray and black areas, as will be shortly described, thus produces a signature of the characteristic feature 56 so that comparison of the signature with a subsequent part will determine whether the side 64 or the side 66 of the part 54 is in view of the vidicon.

The operation of the system of the present invention may be roughly divided to a "teach" mode and a "run" mode. In the teach mode, a test part 54 placed on the presenter state 16 is viewed by the vidicon 12 and a signature distinctive of the characteristic feature 56 is determined and stored in a file. In the run mode a subsequent part is viewed on the stage 16 and the vidicon output is compared to the signatures of the various test part faces contained in the file until a signature in the file well correlates with the subsequent part of which time the face of the subsequent part in view is determined.

Figure 2:
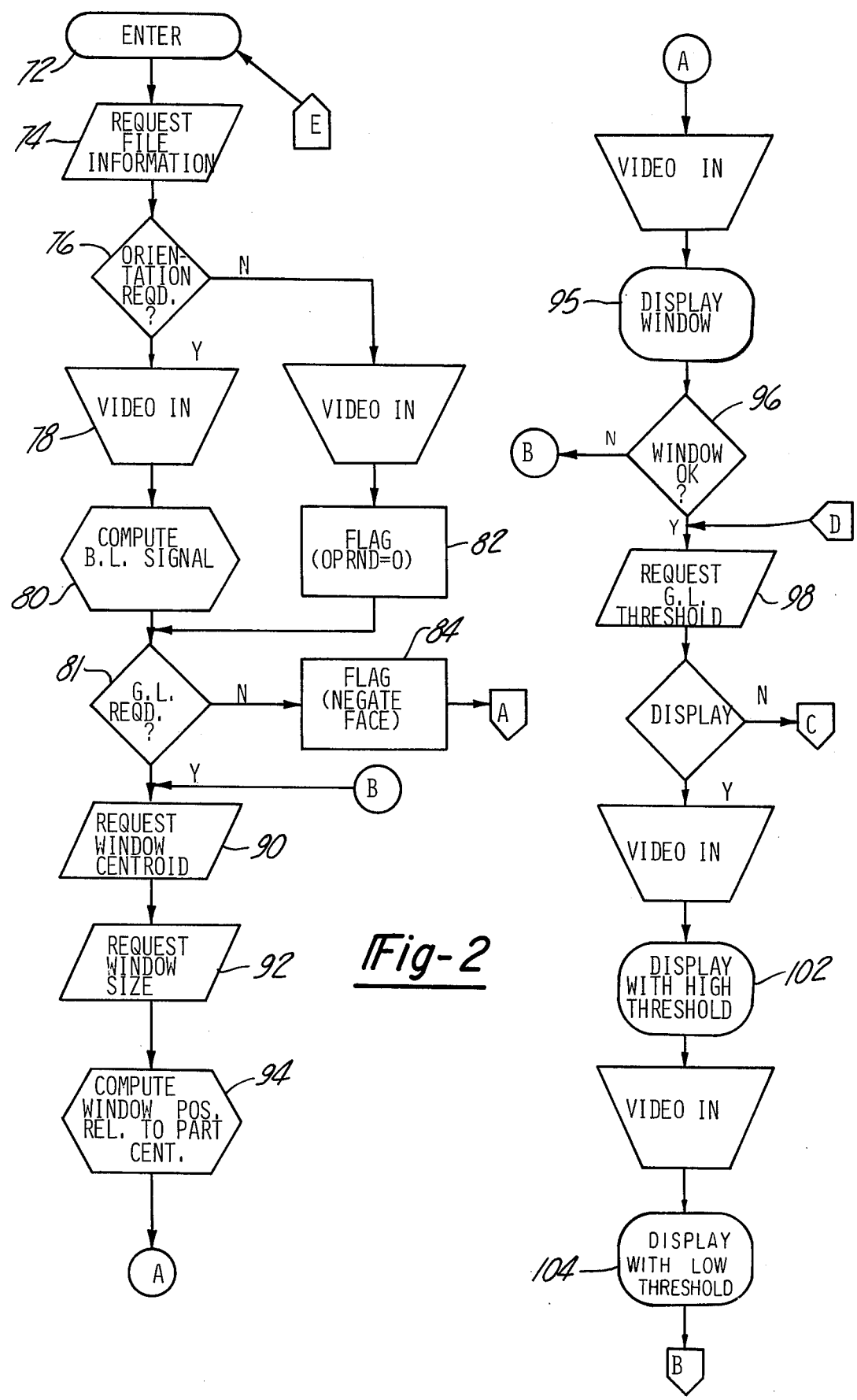
FIGS. 2 and 3 are flow charts illustrating the sequence of operation of a preferred form of the present system during the teach sequence.
Figure 3:
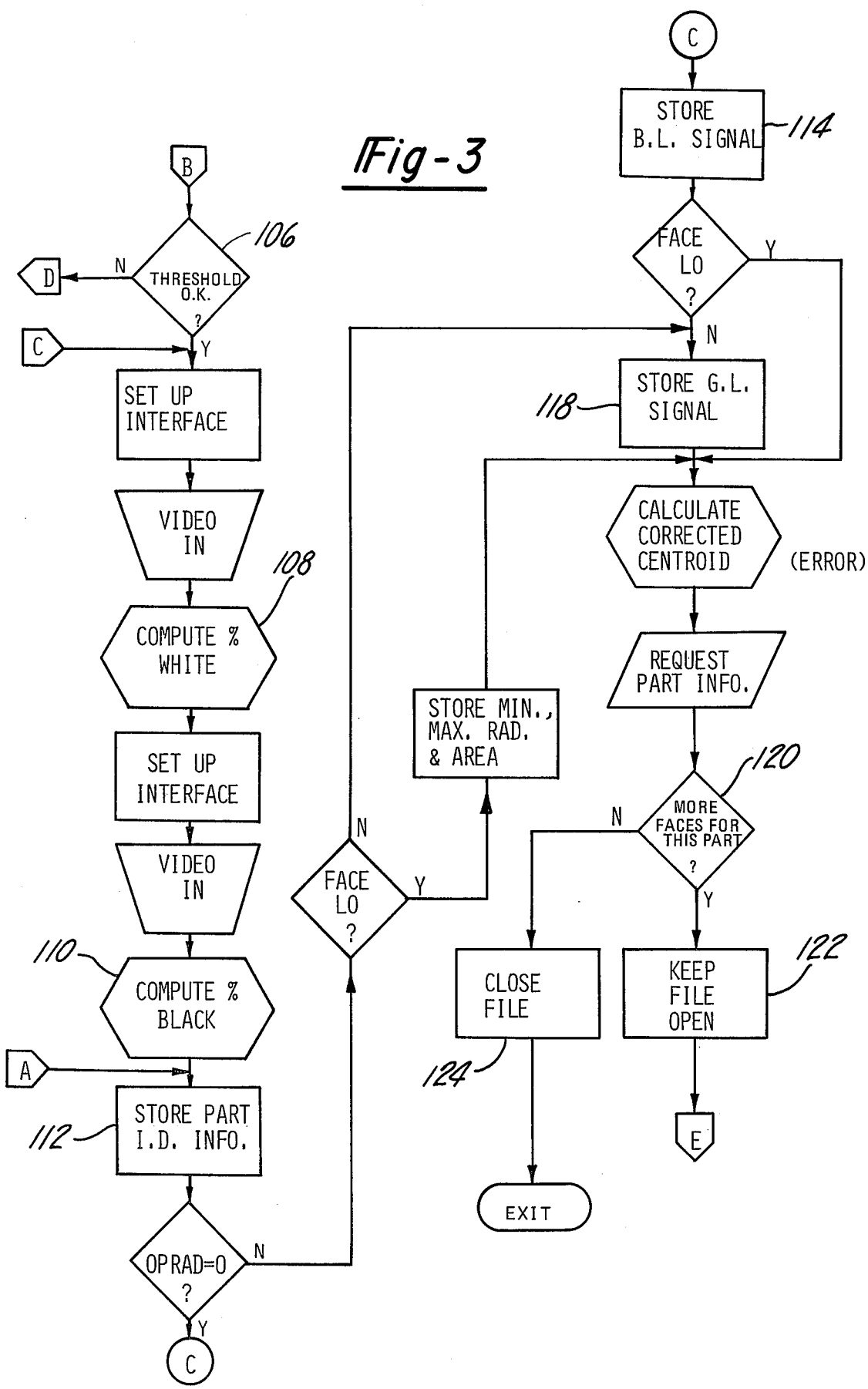

The sequence of operation for the teach mode is best illustrated by the flow chart of FIGS. 2 and 3. After the entry to the program at 72 the control unit 42 interacts with the terminal 44 to request an identifying number for the silhouette and face identification at step 74. At the next step 76, the control unit 42 interrogates the operator through the terminal 44 as to whether orientation of the test part on the stage 16 is required. The control unit 42 directs the vidicon 12 to take a picture at 78 in order to compute the backlit signature at 80 as described in the aforementioned patent application. As will be found in the aforementioned application, computations of the backlit signature yields the X and Y coordinate position for the part centroid and also the angle of orientation of the test part. If no orientation is required, the optimum radius is set to zero at step 82.

The control unit 42 then interrogates the operator at 81 as to whether gray level processing, necessary to enhance a characteristic feature on the surface, is required. If no gray level is required, programming exists by box 84 in a manner unimportant to the present invention. Assuming that gray level processing is required, the operator by viewing the monitor 28 determines the X and Y coordinates of the centroid 86 of a window area 88 (FIG. 6) and the radius of the window area adequate to encompass the characteristic feature of the part 54. This information is fed by the operator through terminal 44 to the control unit 42 at steps 90 and 92 and the control unit 42 computes the position of the window at 94 relative to the centroid of the part 54. The control unit 42 then sends electrical output signals to the deflection scan controllers 18 and 20 so that only the circular window area 88 entered by the operator is displayed on the monitor 28 shown at step 95. Then at step 96 the system interrogates the operator as to whether the selection and size of the window area is adequate. If not, programming returns to step 90 where an updated window position size is entered by the operator.

The control unit 42 next at step 98 requests the operator to enter a pair of separate threshold levels. The threshold level defines the voltage input level from the vidicon 12 to the threshold detector 32 at which the threshold detector output 36 changes from one binary level to the other. One threshold level, denoted the WHITE/GRAY (W/G) threshold, is determined so that the threshold detector output assumes one binary level when the vidicon 12 scans a white area and assumes the opposite binary level when the vidicon 12 scans a gray or black area. Analogously, the other threshold level, denoted the GRAY/BLACK (G/B) threshold, is set so that the threshold detector output assumes one binary level as the vidicon 12 scans a black area while the threshold detector output generates the opposite polarity binary output when the vidicon scans a white or gray area. It thus can be seen the W/G threshold serves to separate out the white area in the window while the G/B threshold serves to separate out the black area in the window.

In order to aid the operator in the proper selection of the threshold level, a display 100 (FIG. 1) is provided for displaying the vidicon window output as viewed with both threshold values and shown at steps 102 and 104. Moreover, it has been found helpful to connect an oscilloscope to the threshold detector transition line 34 to detect the transition from one polarity to the other as the vidicon 12 scans the window area, in order for the operator to determine the proper threshold levels. After displaying the area with the different threshold levels, the controller 42 interrogates the operator at step 106 as to whether the proper thresholds have been determined. If not, programming is returned to step 98 and the operator enters new threshold levels until the proper threshold levels are obtained.

With the proper threshold levels determined, the amount or percentage of white area within the window is computed using the W/G threshold at step 108 and the percentage of black area within the window is computed using the G/B threshold level at step 110. The percentage of gray area within the window is computed by subtracting the percentage of white and black areas from one hundred percent.

The information thus far obtained is next stored in a file and forms a signature for the test part. The silhouette and face number are first stored in the file at step 112. Next the backlit signature is stored in the file at step 114 if orientation is required or if not, the maximum and minimum radius are stored in the file at 116 as described by the aforementioned patent application. The gray level signature, as taught by the system of the present invention, is then stored in the file at step 118 and includes information defining the window size and position relative to the centroid and orientation of the test part, the W/G and G/B thresholds, and the relative amount of white, gray and black areas within the window. The system then interrogates the operator at 120 as to whether there are additional faces for the test part. If additional faces exist, a file delimiter is placed in the file at 122, programming is returned to entry point 72 and the sequence of operation thus far described is repeated. If no additional faces exist, the file is closed at step 122 and the teach portion of the present system is completed.

Figure 4:
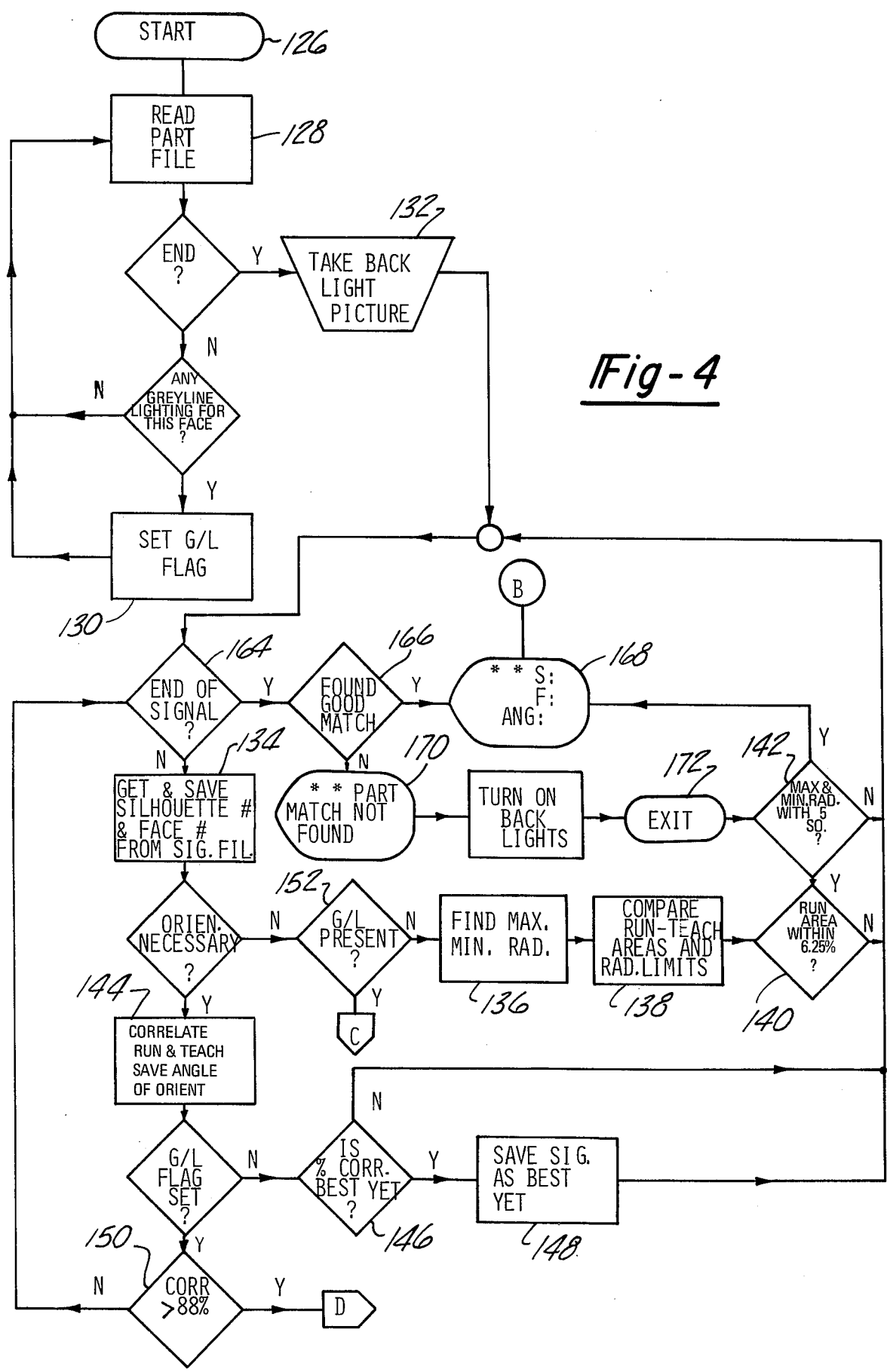
FIGS. 4 and 5 are flow charts illustrating the sequence of operation of a preferred form of the present system during the run sequence.
Figure 5:
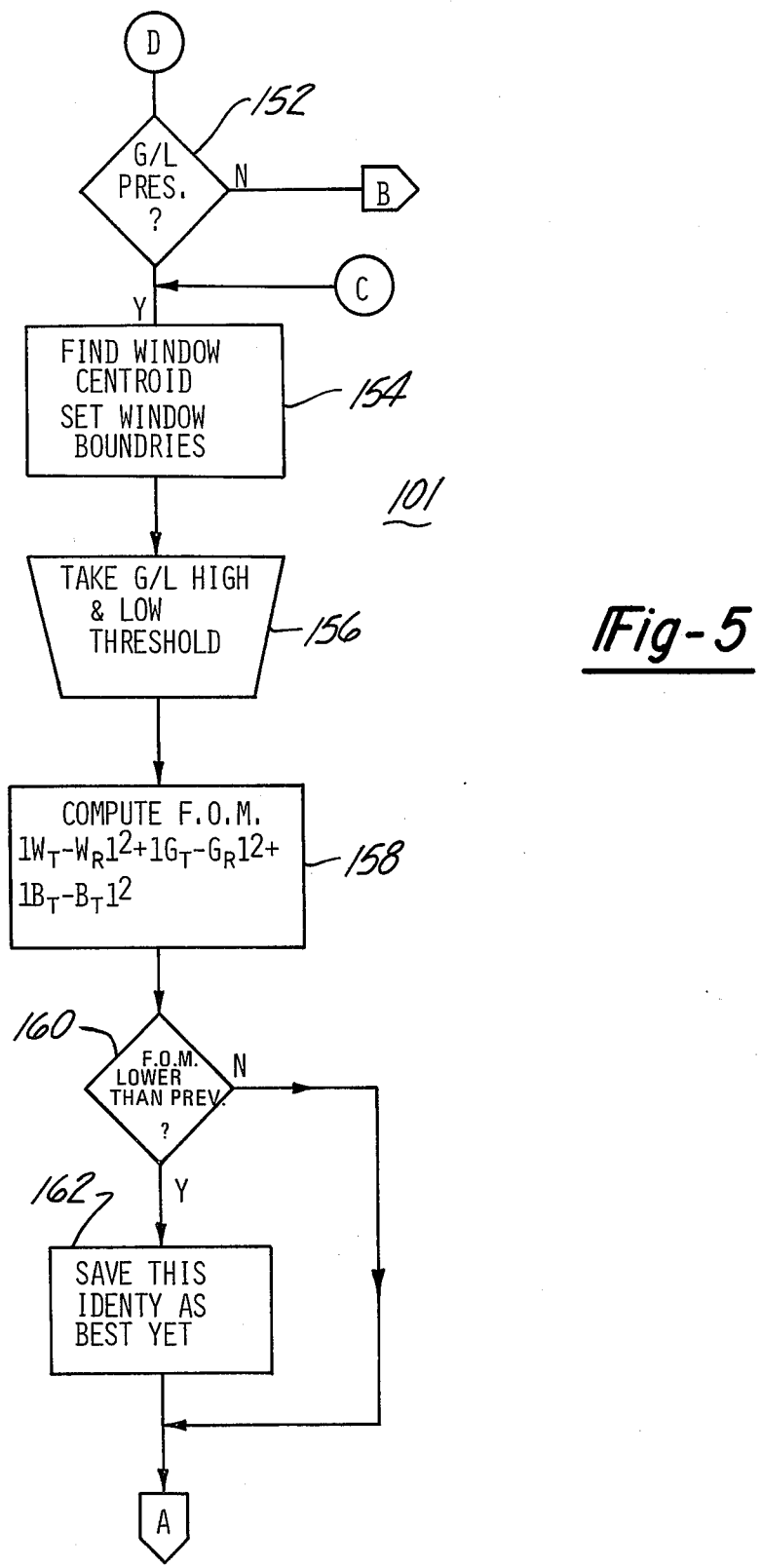

At the completion of the teach sequence, the run mode may be utilized to compare a subsequent part with the test part signature stored in the file in order to determine which face of the part is in view. Although the sequence of events in the run mode may take any of several forms, an exemplary sequence of operations for the run mode is illustrated in FIGS. 4 and 5. Following the entry point 126 to the run mode the test part signature file is read at box 128. A GRAY/LEVEL flag is set at step 130 if gray level lighting is required and a backlit picture is taken at step 132.

The silhouette and face numbers are read from the signature file at 134. If no orientation of the part is required nor gray level lighting of the part, processing continues through steps 136, 138, 140 and 142 as described by the aforementioned patent application. If orientation of part is required, but not gray level lighting, the silhouette of the part is correlated with the silhouette of the test part at step 144 and processing continues through steps 146 and 148 also as described in the previous application. When gray level lighting is required and the correlation between the part and the test part silhouette exceeds an arbitrary figure, such as 88% indicated at step 150, processing continues in the gray level routine 101 shown in FIG. 5. Likewise if no orientation of the part is required, but gray level lighting is required, as determined at step 152, processing continues in the gray level routine 101.

In the gray level routine 101 (FIG. 5), the position of the centroid of the window, relative to the centroid of the part, and the size of the window are first determined from the signature file at step 154. The control unit 42 then generates electrical control signals X and Y deflection controllers 18 and 20 so that the vidicon 12 scans the window area. Simultaneously the control unit 42 transmits a signal to the threshold controller 38 which in turn generates a control signal along line 40 to the threshold detector 32 so that the picture of the window area is first taken using the W/G threshold and a second picture is taken using G/B threshold as indicated at step 156. The control unit 42 then analyzes the vidicon output via the threshold detector 32 and computes the amount of white, gray and black area within the window area for the part presently in view in the previously described manner.

The control unit then computes a figure of merit (F.O.M.) at 158 which correlates the amount of white, gray and black area of the test part with the white, gray and black area of the part presently in view. More specifically, the difference between the white area of the test part ($W_t$) and the white area of the part in view ($W_r$) is squared and added to the analogous differences for the gray and black areas. Thus as the correlation between test part and the part presently in view becomes better and smaller F.O.M. is produced. Consequently, at step 160 if the F.O.M. is lower than previously found, the face and silhouette number are stored at 162 as the best identity yet achieved and processing continues at entry point A. If a smaller F.O.M. has been previously found, step 152 is bypassed and processing again continues at entry point A.

At the end of the signature file, as determined by step 164, the control 42 determines at 166 whether or not a good match between the part under view and a test part signature has been found. The silhouette and face number and angle of orientation are displayed at 168 if a good match is found and, if not, step 170 indicates that a sufficiently good match has been found. Exit from the run mode is then had at 172 and subsequent sequencing, such a control signals to a manipulator, continues as desired.

As previously described the teach mode is interactive with the operator in that operator specifies the position and area of the window and the threshold levels. However, in a modification of the invention, the teach mode may be automated in the following manner. The test part 54 is placed on the presenter stage and is scanned by the vidicon 12 at various angles of oblique light. The threshold is adjusted to obtain maximum "difference" or contrast of features and the differences are temporarily stored in a separate file. The differences are then ANDed together and, as a result of this summation, a tentative feature is selected based on whether the feature is invariant to the angle of incident light and whether the area is sufficiently large to be reliable. After a suitable feature has been determined the processing continues in the above described manner.

Other modifications to the systems of the invention will become apparent to those skilled in the art to which it pertains without deviation from the spirit of the present invention as defined by the appended claims.

What is claimed is:

1. A system for identifying a face on three dimensional test body on a stage by comparing an optical representation of the face with stored signals indicative of optical representations of comparison faces of three dimensional comparison bodies, said system comprising:
    means for illuminating comparison faces sequentially and for generating and storing an optical representation of the relative amounts of white, gray and black areas on each comparison face.
    means for illuminating said test body in a first direction and for creating an optical image,
    means for receiving the optical image in a second direction oblique to said first direction,
    means for generating electrical signals representative of the relative amount of white, gray and black area as viewed in said second direction,
    means for generating a signature signal comprising information representative of said relative amounts of white, gray and black areas on the face of the test body, and
    means for comparing the signature signal of the face with the stored signals indicative of optical representations of the comparison faces to determine which face is being viewed.

2. The system as defined in claim 1 and further comprising means for generating electric signals representative of the centroid of the silhouette of said body, means for generating electrical signals representative of the position of said centroid relative to a predetermined reference point wherein said signature signal includes information representative of the position of said centroid relative to said reference point.

3. The system as defined in claim 2 and further comprising means for generating electrical signals representative of the angular position of said body relative to a predetermined angular reference position wherein said signature signal includes information representative of angular position.

4. The system as defined in claim 1 in which said means for receiving the optical image comprises a scanning type image converter adapted to generate an electrical analog signal representative of the illumination intensity of the optical image viewed and a threshold detector adapted to generate a first binary electrical signal when said analog signal is below a given threshold level and a second binary electrical signal when said analog signal is above said given threshold level.

5. The system as defined in claim 4 in which said means for generating electrical signals representative of the relative amounts of white, gray and black areas further comprises means for establishing first and second separated threshold levels so that electrical signals representative of the white area are generated with said first threshold value and electrical signals representative of the black area are generated with said second threshold value.

6. The system as defined in claim 5 wherein said means for illuminating the body produces a gray area and in response to said signal from said image converter from said gray area, said threshold detector generates said first binary signal with said first threshold level, and said threshold detector generates said second binary signal with said second threshold level.

7. The system as defined in claim 1 and including means for receiving the optical image of a preselected window area on said stage, means for determining the centroid of said body and determining distance and phase of said window area relative to said centroid wherein said signature signal includes information representative of said distance and phase of said window area relative to said centroid and an angular reference point.

8. The system as defined in claim 7 and including means to vary the size of said window area wherein said signature signal includes information representative of the size of said window area.

9. A method of identifying a face of a test object relative to faces of comparison objects, the steps of the method comprising:
    identifying individually a plurality of faces of comparison objects by illuminating a face in at least two directions to create a comparison image; producing a comparison signal representative of the relative amount of white and black at two different gray-level thresholds for each face; and storing the comparison signal as representative of the face;
    illuminating the test object in at least two directions to create a test image of the test object;
    generating a signature signal indicative of the relative amounts of white and black in the test image at corresponding to two different gray-level thresholds; and
    comparing the signature signal generated with at least one of the stored comparison signals to identify the test object with respect to the faces of the comparison objects, whereby the face of the test object may be identified as corresponding to one of the faces of the comparison objects.

* * * * *

UNITED STATES PATENT AND TRADEMARK OFFICE
CERTIFICATE OF CORRECTION

PATENT NO. : 4,041,286

DATED : August 9, 1977

INVENTOR(S) : Norman R. Sanford

It is certified that error appears in the above-identified patent and that said Letters Patent are hereby corrected as shown below:

```
Column 1, Line 56, "no" should read --not--;
Column 3, Line 22, "the" should read --that--;
Column 3, Line 28, before "converter" insert --image--;
Column 3, Line 29, "state" should read --stage--;
Column 4, Line 26, before "plurality" insert --a--;
Column 4, Line 45, "state" should read --stage--;
Column 4, Line 51, "of" should read --at--;
Column 6, Line 51, before "x" insert --to the--;
Column 6, Line 56, "the" (first occurrence) should read --a--;
Column 6, Line 58, before "G/B" insert --the--;
Column 7, Line 5, "better and" should read --better, a--;
Column 7, Line 17, before "been" insert --not--;
Column 7, Line 19, "a" (first occurrence) should read --as--;
Column 7, Line 22, before "operator" (second occurrence) insert --the--;
Claim 1, Line 41, before "three" insert --a--;
Claim 1, Line 47, before "comparison" insert --said--;
Claim 2, Line 66, "electric" should read --electrical--; and
Claim 3, Line 9, before "angular" insert --said--.
```

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*